(12) United States Patent
Orchard

(10) Patent No.: US 12,337,989 B2
(45) Date of Patent: Jun. 24, 2025

(54) CRYOGENIC TANK

(71) Applicant: Zero Emissions Aerospace Limited, Bristol (GB)

(72) Inventor: Matthew Noel Orchard, Bristol (GB)

(73) Assignee: Zero Emissions Aerospace Limited, Bristol (GB)

( * ) Notice: Subject to any disclaimer, the term of this patent is extended or adjusted under 35 U.S.C. 154(b) by 56 days.

(21) Appl. No.: 18/054,429

(22) Filed: Nov. 10, 2022

(65) Prior Publication Data

US 2023/0143288 A1  May 11, 2023

(30) Foreign Application Priority Data

Nov. 10, 2021 (EP) ..................................... 21207552

(51) Int. Cl.
*B64D 37/30* (2006.01)
*B64D 37/04* (2006.01)
(Continued)

(52) U.S. Cl.
CPC ............. *B64D 37/30* (2013.01); *B64D 37/04* (2013.01); *B64D 37/06* (2013.01); *F17C 3/08* (2013.01); *F17C 13/086* (2013.01); *F17C 2201/0109* (2013.01); *F17C 2201/035* (2013.01); *F17C 2201/054* (2013.01); *F17C 2203/012* (2013.01); *F17C 2203/0391* (2013.01); *F17C 2203/0629* (2013.01); *F17C 2203/0646* (2013.01); *F17C 2203/0663* (2013.01); *F17C 2205/0119* (2013.01); *F17C 2205/0153* (2013.01); *F17C 2221/012* (2013.01); *F17C 2223/0153* (2013.01); *F17C 2223/0161* (2013.01); *F17C 2223/033* (2013.01); *F17C 2260/011* (2013.01); *F17C 2260/012* (2013.01); *F17C 2265/066* (2013.01); *F17C 2270/0189* (2013.01)

(58) Field of Classification Search
CPC .................... B64D 37/30; B64D 37/06; F17C 2201/0109; F17C 2203/012; F17C 2203/0629; B60K 15/03; B60K 15/03006; B60K 2015/03111; B60K 2015/03164; B60K 2015/03171
See application file for complete search history.

(56) References Cited

U.S. PATENT DOCUMENTS 2,545,481 A * 3/1951 Maier .................... B64D 37/12
220/4.15
5,533,340 A  7/1996 Shama et al.
(Continued)

FOREIGN PATENT DOCUMENTS

| CN | 205707384 U | 11/2016 |
|----|----|----|
| DE | 102017129526 A1 | 6/2019 |
| EP | 2877776 B1 | 2/2019 |

*Primary Examiner* — Ashesh Dangol
(74) *Attorney, Agent, or Firm* — Smartpat PLC

(57) ABSTRACT

A cryogenic tank for storing cryogenic fluids is disclosed. The cryogenic tank is typically configured to be mounted on a vehicle for supplying cryogenic fuel to a propulsion system of the vehicle. The cryogenic tank comprises an inner vessel for containing cryogenic fluids and an outer vessel surrounding the inner vessel to define a vacuum insulating volume therebetween. The outer vessel is configured to transmit static and/or dynamic loads, while the inner vessel is partially or completely isolated from such loads.

16 Claims, 7 Drawing Sheets

(51) Int. Cl.
  *B64D 37/06* (2006.01)
  *F17C 3/08* (2006.01)
  *F17C 13/08* (2006.01)

(56) References Cited

U.S. PATENT DOCUMENTS

| | | |
|---|---|---|
| 6,347,719 B1 | 2/2002 | Rosen et al. |
| 2017/0130900 A1* | 5/2017 | Strange .................... F17C 3/08 |
| 2023/0035247 A1* | 2/2023 | Hernaiz Lopez ......... F17C 1/02 |

* cited by examiner

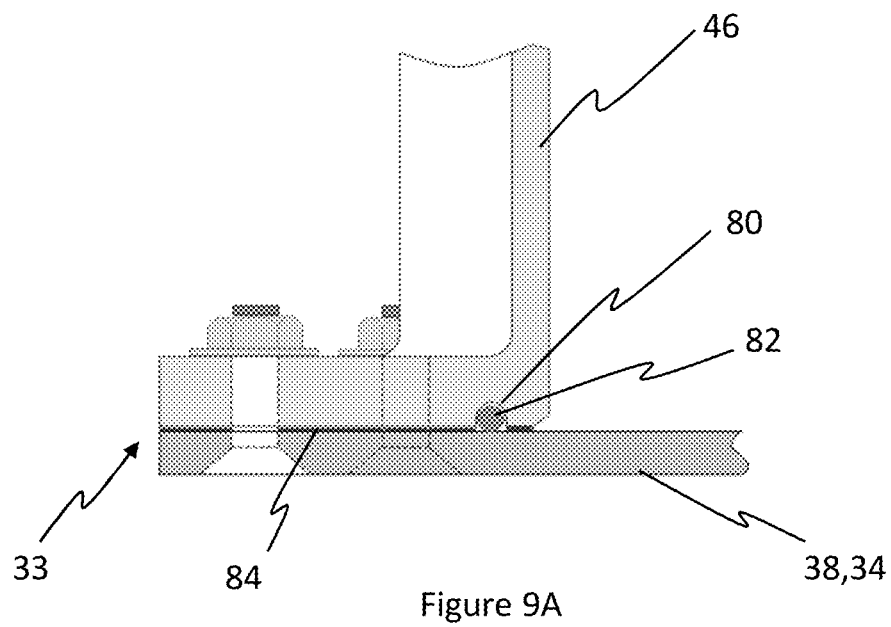
Figure 9A
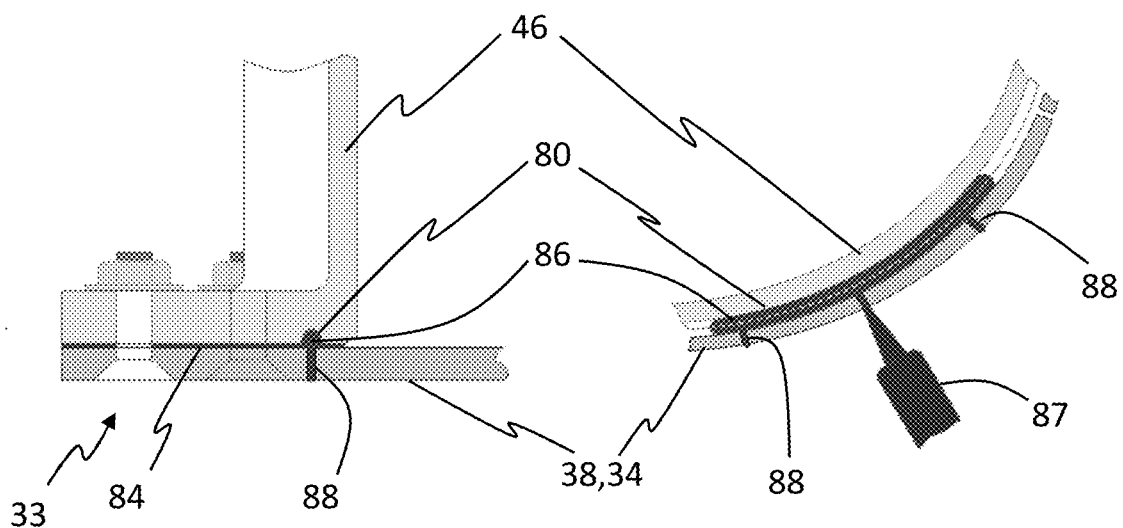
Figure 9B
Figure 9C

CRYOGENIC TANK

CROSS-REFERENCE TO RELATED APPLICATION

This application claims the benefit of European Patent Application No. 21207552, filed 10 Nov. 2021, the contents of which is incorporated by reference in its entirety.

TECHNICAL FIELD

This invention relates to a cryogenic tank for supplying a propulsion system of a vehicle, and related aspects.

BACKGROUND

Cryogenic tanks for containing cryogenic fuel have been widely used in space applications for some time, and have attracted some more recent interest in non-space applications such as fixed wing aircraft, eVTOL and marine applications, which have challenging new requirements if satisfactory performance is to be obtained. The present invention builds on this body of work, with an aim to produce an improved cryogenic tank.

SUMMARY

In general terms, the disclosure provides a cryogenic tank for storing cryogenic fluids. The cryogenic tank is typically configured to be mounted on a vehicle for supplying cryogenic fuel to a propulsion system of the vehicle. The cryogenic tank comprises an inner vessel for containing cryogenic fluids and an outer vessel surrounding the inner vessel to define a vacuum insulating volume therebetween. The outer vessel is configured to transmit static and/or dynamic loads, while the inner vessel is at least partially isolated from such loads.

The terms cryogenic fluids and cryogenic fuels used herein have their typical meaning as used in the art. Cryogenic fluids or fuels typically have a boiling point of below 120 Kelvin. Cryogenic fuels include liquified gases such as liquid hydrogen.

A first aspect of the disclosure provides a cryogenic tank for supplying a propulsion system of a vehicle, the tank comprising: an inner vessel defining a closed volume configured to carry a cryogenic fuel; an outer vessel enclosing the inner vessel to define an insulating volume therebetween, the insulating volume comprising a vacuum, and the outer vessel comprising one or more mounting members for mounting the tank on a vehicle, the one or more mounting members permitting transfer of static and/or dynamic loads between the vehicle and the outer vessel; and vessel mounting means structurally connecting the inner vessel to the outer vessel, and configured to avoid transfer of said static and/or dynamic loads from the outer vessel to the inner vessel.

By transmitting loads through the outer vessel the overall mass and size of the both the vehicle and tank can be minimised since it is not necessary to contain the tank within further structure specifically designed to carry any loads associated with thermal effects, vehicle operation, propulsion etc. This is particularly important in applications where the volume or mass of the tank may be influential on the overall efficiency or viability of a vehicle. For example, in aircraft applications mass must be minimised as a priority, since every extra kilogram has a measurable effect on aircraft efficiency. Moreover, the tank has benefits in applications in which the tank defines the envelope of a vehicle. For example, in aircraft applications the tank must either be accommodated within the aerodynamic envelope of the airframe (e.g. within a wing or fuselage section) or it must be suspended outside of that envelope and therefore be shaped and sized to minimise its impact on aerodynamic drag, including both profile drag and parasitic drag. In particular, the minimised tank volume minimises the surface area exposed to air flow and therefore minimises parasitic drag and enables profile drag to be readily managed.

The vehicle may be any vehicle with a propulsion system requiring a supply of a cryogenic fuel. For example, aircraft, marine vehicles, land vehicles, or space vehicles. The disclosed tank is considered to be particularly applicable to applications where weight and space-volume are important design factors.

The inner vessel may have any shape appropriate to its function as a receptacle for cryogenic fluids. The inner vessel may be configured to contain cryogenic fluids maintained at an above-atmospheric pressure. The inner vessel may thus be provided as a pressure vessel. That is, the inner vessel may have any shape or configuration appropriate for a pressure vessel. One appropriate shape comprises a central cylindrical portion capped by two domed portions.

The vacuum of the insulating volume may be a complete or partial vacuum. For example, a vacuum of 10 mTorr or less may be appropriate. In some embodiments a soft vacuum of 10,000 mTorr or less may be appropriate. In some embodiments the insulating volume is empty, save for structural or systems components of the tank. In other embodiments the insulating volume may contain microbeads (e.g. particles of an insulating material) or aerogel. For example, the insulating volume may contain a plurality of microbeads enclosed within a flexible membrane, or bag; this arrangement may permit some load transfer via the microbeads.

The outer vessel may have any shape appropriate to its functions of enclosing the inner vessel and mounting the tank on a vehicle. In particular, the outer vessel may have an outer surface that is configured to provide an outer surface of a vehicle on which the tank is mounted. That is, at least a portion of the outer vessel may have an outer surface that forms at least a portion an outer surface of a vehicle on which the tank is mounted in use. For example, in applications in which the tank is for mounting on an aircraft the outer vessel may have an outer surface that forms an aerodynamic surface of the aircraft.

The one or more mounting members may be configured to permit mounting of the tank to a load-carrying member of the vehicle. For example, in aircraft applications the one or more mounting members may be configured to permit mounting of the tank to the airframe, or joining it to the airframe as an integral structural member of the aircraft.

The term static and/or dynamic loads is intended to encompass thermal loads, vehicle loads (e.g. flight loads), propulsion loads, or any other forces that are generated within the vehicle, or at the interface between the vehicle and the one or more mounting members. Such loads are transmitted into the outer vessel via the one or more mounting members. Preferably, the one or more mounting members transmit these loads through the outer vessel.

Thus, the one or more mounting members may extend longitudinally along the outer vessel, each mounting member may comprise two or more longitudinally-spaced mounting locations for connecting the tank to a vehicle, and/or each mounting member may be configured to transfer of static and/or dynamic loads between the two or more mounting locations. In this way, the mounting members provide a convenient and efficient means of transmitting at least some of the loads transferred between the vehicle and the outer vessel.

In preferred embodiments the one or more mounting members include one or more flanges extending outwardly from the outer vessel. The one or more flanges may extend longitudinally along the outer vessel, to permit transfer of loads in a longitudinal direction. For example, in aircraft applications the one or more flanges may extend in a forward-aft direction. Alternatively, the one or more flanges may extend annularly around an outer periphery of the outer vessel.

The one or more flanges may each include one or more fastener holes at a mounting location, the one or more fastener holes being configured to accommodate one or more fasteners to connect the tank to a vehicle. The fasteners thus extend through the one or more flanges, but do not penetrate the insulating volume. Such an arrangement has the advantage of enabling ready attachment to a vehicle without providing a potential leak site for the sealed insulating volume. Such an arrangement may also be used to connect aerodynamic fairings and other vehicle components. The one or more fastener holes may be reinforced with a reinforcing component such as a bush.

The one or more flanges may have an increased thickness, width, height, volume or surface area in the region of each mounting location, in order to accommodate increased load transfer at the mounting locations.

The one or more flanges may be formed integrally with at least one panel of the outer vessel. This arrangement provides a particularly robust, weight-efficient solution.

The outer vessel preferably comprises one or more panels and one or more reinforcing members mounted on the one or more panels. The reinforcing members serve to increase stiffness of the panels. They may, for example, comprise stringers and/or components formed from geodesic, geodetic or other typology optimised patterns such as a space frame or three-dimensional truss-like structure constructed from interconnecting struts arranged in a geometric, geodetic or geodesic pattern.

In particularly preferred embodiments the one or more reinforcing members project inwardly from the one or more panels of the outer vessel into the insulating volume. This is a particularly efficient use of the available space, and serves to minimise the overall envelope of the tank. It is also an advantageous arrangement in applications in which the outer vessel provides an outer (e.g. aerodynamic) surface of a vehicle on which the tank is mounted or is otherwise exposed in use.

In some examples the outer vessel comprises first and second panels, the first panel comprising one or more outwardly-extending flange portions that overlap with one or more corresponding regions of the second panel to thereby join the first and second panels and provide one or more flanges extending outwardly from the outer vessel. In this way, the panels may be joined at the one or more flanges. In particular, mechanical fasteners may be used to effect the join without penetrating the sealed insulating volume.

Preferably, the one or more flanges provide the one or more mounting members. Thus, the flanges resulting from the joining approach described above also provide a means for load transfer through the outer vessel.

The tank may comprise a plurality of fasteners joining the first and second panels, the plurality of fasteners extending through the one or more flanges and not penetrating the insulating volume.

The first and second panels may be joined by one or more of: mechanical fastening means, bonding, or co-curing. In specific embodiments the second panel comprises a pair of opposing walls, the first panel comprises a pair of flange portions, and the first panel is nested within the second panel such that the flange portions overlap with the walls.

In some embodiments an elongate sealing channel may be provided in at least one of the one or more outwardly-extending flange portions of the first panel or the overlapping corresponding region of the second panel, the sealing channel comprising (or being configured to comprise) an elastomeric elongate sealing component (e.g. an O-ring type seal) or an elongate bead of curable sealing material to provide a fluid-tight seal between the first and second panels.

In some embodiments the elongate sealing channel comprises one or more sealant ports in fluid communication with the sealing channel and an opening configured to enable insertion of the nozzle of a sealant gun. Thus, curable sealant material can be injected into the sealing channel via the one or more sealant ports. In embodiments in which there are a plurality of sealant ports, sealant material injected into a first of the one or more sealant ports may exit via a second (or more) of the one or more of the sealant ports when the sealing channel is sufficiently filled with sealant material. Thus, the sealant ports may provide an indicator that the sealant channel is filled with sealant material.

The first and second panels may define a generally tube-shaped (e.g. cylindrical) volume, and the outer vessel may further comprise first and second end caps to seal the generally tube-shaped (e.g. cylindrical) volume, optionally wherein the first and/or second end cap comprises a generally dome-shaped member, and further optionally wherein the second end cap comprises a bulkhead. The tube-shaped volume may have any cross-sectional shape suitable for both maintaining the vacuum in the insulating volume (e.g. by acting as a pressure vessel) and providing an appropriate outer geometry (e.g. an appropriate aerodynamic surface in aircraft applications). Appropriate cross-sectional shapes include circles, distorted circles, ellipses, or multi-lobed circles, for example.

In some embodiments an elongate sealing channel may be provided in the first and/or second end caps, the sealing channel comprising (or being configured to comprise) an elastomeric elongate sealing component (e.g. an O-ring type seal) or an elongate bead of curable sealing material to provide a fluid-tight seal between the first end cap and the first and second panels, and/or between the second end cap and the first and second panels. For example, the sealing channel may comprise an annular sealing channel extending around a periphery of the generally tube-shaped volume.

In some embodiments the elongate sealing channel comprises one or more sealant ports in fluid communication with the sealing channel and an opening configured to enable insertion of the nozzle of a sealant gun. Thus, curable sealant material can be injected into the sealing channel via the one or more sealant ports. In embodiments in which there are a plurality of sealant ports, sealant material injected into a first of the one or more sealant ports may exit via a second (or more) of the one or more of the sealant ports when the sealing channel is sufficiently filled with sealant material. Thus, the sealant ports may provide an indicator that the sealant channel is filled with sealant material.

In some embodiments at least one of the one or more flanges extends longitudinally along the outer vessel. In such embodiments the at least one flange may comprise two or more longitudinally-spaced mounting locations for connecting the tank to a vehicle, and said at least one flange may be configured to transfer of static and/or dynamic loads between the two or more mounting locations.

In yet further embodiments at least one of the one or more flanges may extend around a perimeter of the outer vessel.

The vessel mounting means is preferably configured to permit relative movement between the inner vessel and the outer vessel. This arrangement serves to reduce, avoid or prevent transfer of loads from the outer vessel to the inner vessel.

The vessel mounting means preferably comprises a thermal insulating material for limiting heat transfer between the inner vessel and the outer vessel. This arrangement serves to reduce, avoid or prevent transfer of thermal loads between the outer and inner vessels and to reduce thermal heat transfer or losses into the stored cryogenic fluid.

In some embodiments the vessel mounting means comprises a first mounting member connected to the inner vessel and a second mounting member connected to the outer vessel, the first mounting member and second mounting member being interconnected to permit relative linear and/or rotational movement therebetween, and optionally wherein the shaft comprises a thermal insulating material for limiting heat transfer between the first mounting member and the second mounting member. Preferably the second mounting member comprises a shaft and the first mounting member comprises a sleeve that is mounted on the shaft such that it is able to slide along the shaft and rotate relative to the shaft. The first and second mounting members are preferably located generally at a longitudinal axis of the tank.

At least one or more panels of the outer vessel may be formed from the same material as the inner vessel, or from a different material. The thermal loads caused by differing thermal expansion coefficients of combinations of different materials may be mitigated by the vessel mounting means described herein.

A second aspect of the disclosure provides a vehicle comprising a load-carrying member configured to transmit static and/or dynamic loads, a propulsion system, and a cryogenic tank according to the first aspect, wherein the cryogenic tank is configured to supply the propulsion system, and the one or more mounting members structurally connect the outer vessel of the cryogenic tank to the load-carrying member of the vehicle.

A third aspect of the disclosure provides an aircraft comprising an airframe configured to transmit aircraft flight loads, a propulsion system, and a cryogenic tank according to the first aspect, wherein the cryogenic tank is configured to supply the propulsion system and the one or more mounting members structurally connect the outer vessel of the cryogenic tank to the airframe.

The airframe optionally comprises a wing spar, and the one or more mounting members optionally structurally connect the outer vessel of the cryogenic tank to the wing spar.

The outer vessel of the cryogenic tank optionally comprises an integral structural member of the airframe. For example, the outer vessel may include one or more stiffening members or one or more panels of the airframe. The stiffening members may include fuselage frames, wing spars, wing ribs or engine-mounting pylon structure, for example. The one or more panels may include one or more outer panels of the aircraft, such as wing cover panels or fuselage panels.

Throughout the description and claims of this specification, the words "comprise" and "contain" and variations of the words, for example "comprising" and "comprises", mean "including but not limited to", and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which:

FIGS. 9A, 9B and 9C schematically illustrate possible sealing configurations.

DETAILED DESCRIPTION

In general terms, the disclosure provides a cryogenic tank 100 for storage and dispensing of cryogenic fluids. For example, cryogenic fluid in the form of liquid hydrogen, or a mixture of liquid and gaseous hydrogen. In the illustrated embodiments the tank 100 is for mounting on an aircraft to supply fuel (in the form of cryogenic fluid) to an aircraft propulsion system. However, in other embodiments the tank 100 may be applied to marine, land or space vehicles. Moreover, the tank 100 may have utility in any application where weight and space/volume are important design factors.

Figure 1:
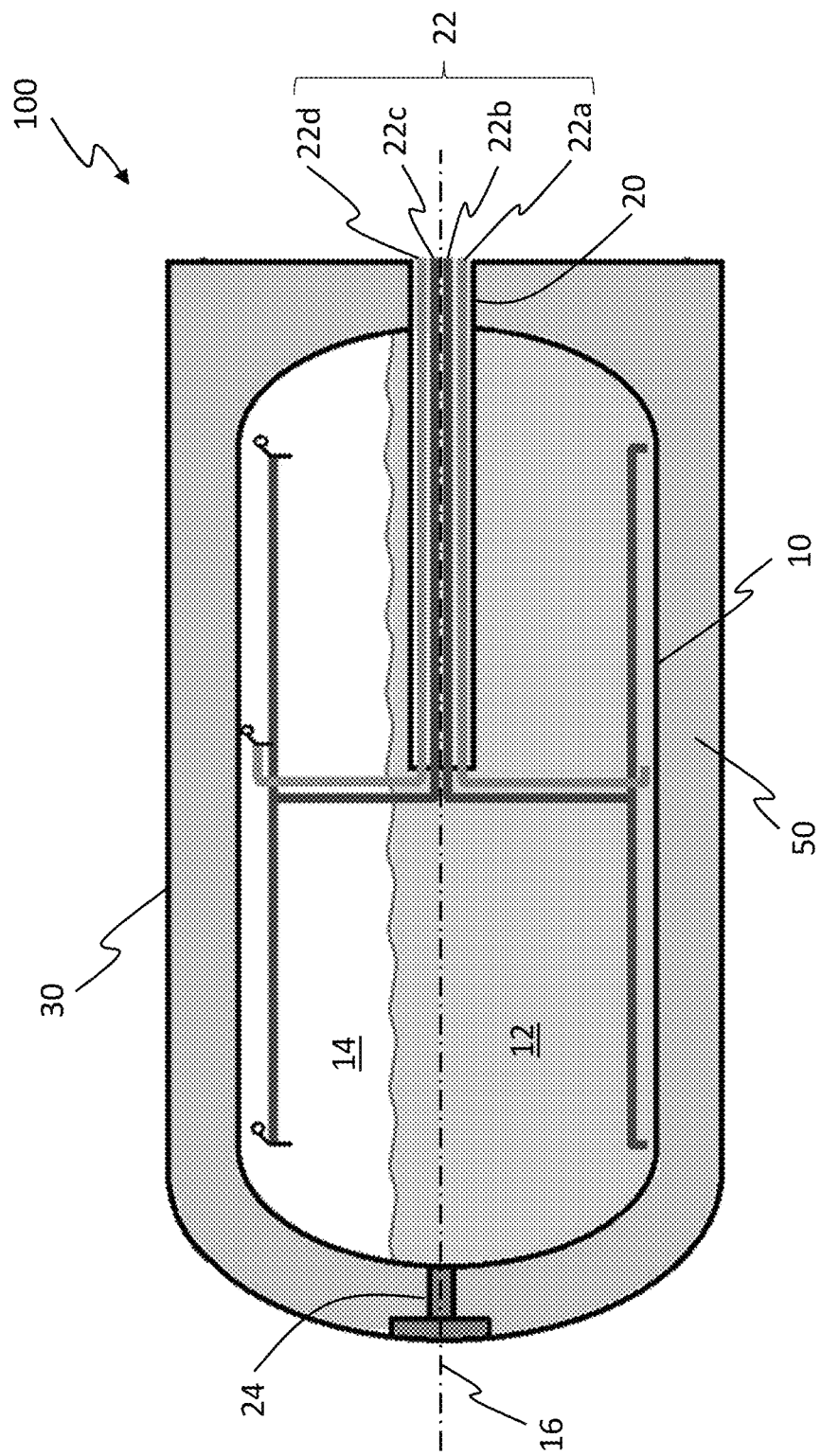
FIG. 1 schematically illustrates a number of features of a cryogenic tank.
Figure 2:
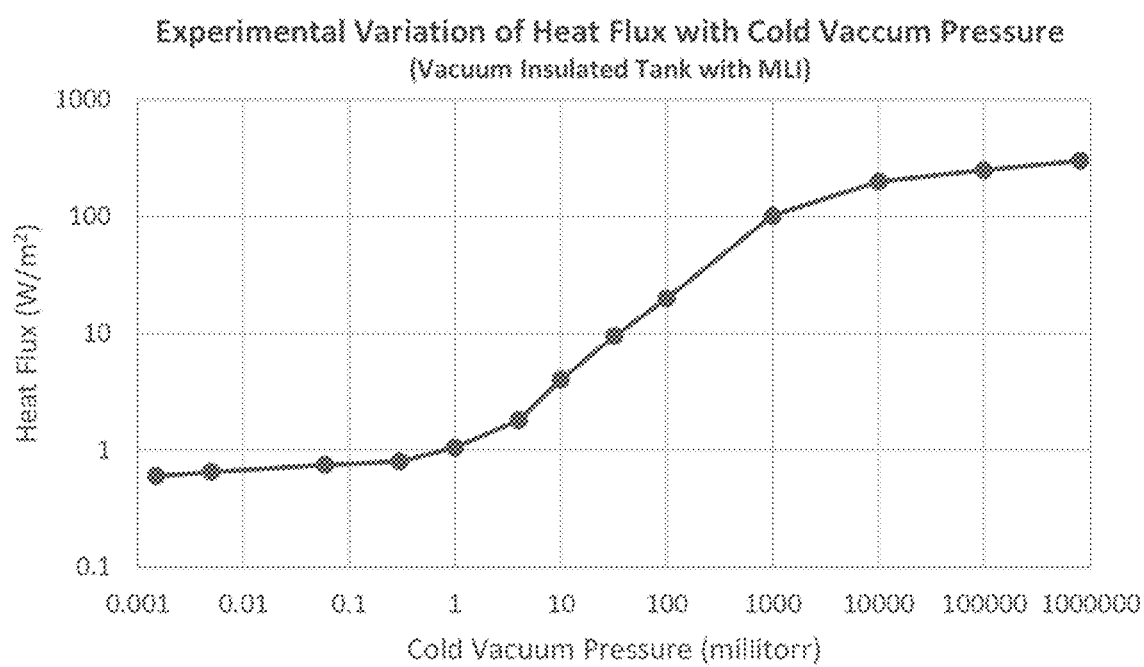
FIG. 2 illustrates appropriate vacuum levels for the insulating volume.

The tank 100 is illustrated schematically in FIG. 1, which shows an inner vessel 10 supported within an outer vessel 30, and an insulating volume 50 therebetween. The insulating volume 50 is maintained at a vacuum, or near vacuum, to provide thermal insulation between the inner 10 and outer 30 vessels. As illustrated in FIG. 2, an appropriate target vacuum pressure is considered to be 10-3 mBar (approximately 0.75 mTorr), though a pressure of 10 mTorr or less may be sufficient.

The inner vessel 10 comprises a fluid-tight reservoir for containing liquid hydrogen 12 and gaseous hydrogen 14. The fluid 12, 14 within the inner vessel 10 is typically at an above atmospheric pressure, and the inner vessel 10 thus forms a pressure vessel. The inner vessel 10 may have any one of a number of geometries appropriate to pressure vessels suitable for containing cryogenic fluids. In the illustrated embodiments the inner vessel 10 has a generally cylindrical central portion centred on a longitudinal axis 16, the central portion being capped at each end by two domed or convex end caps. This shape has been demonstrated to provide optimised structural performance for most applications.

The outer vessel 30 can have any one of a number of geometries appropriate to the application of the tank 100. For example, the outer vessel 30 may have an outer geometry optimised for aerodynamic performance in aircraft applications. The outer vessel 30 preferably has a generally cylindrical, or near-cylindrical, inner volume to provide a structurally optimised shape that minimises weight. In some aircraft applications the tank 100 may be designed to be mounted to an aircraft wing, while in others it may be mounted to an aircraft fuselage. In some cases the outer vessel 30 may be incorporated into the aircraft airframe structure, for example by incorporating fuselage frames, wing spars or ribs, or other structural airframe features.

Three example configurations for the outer vessel 30 are illustrated in FIGS. 3, 4 and 5A-B.

Figure 3:
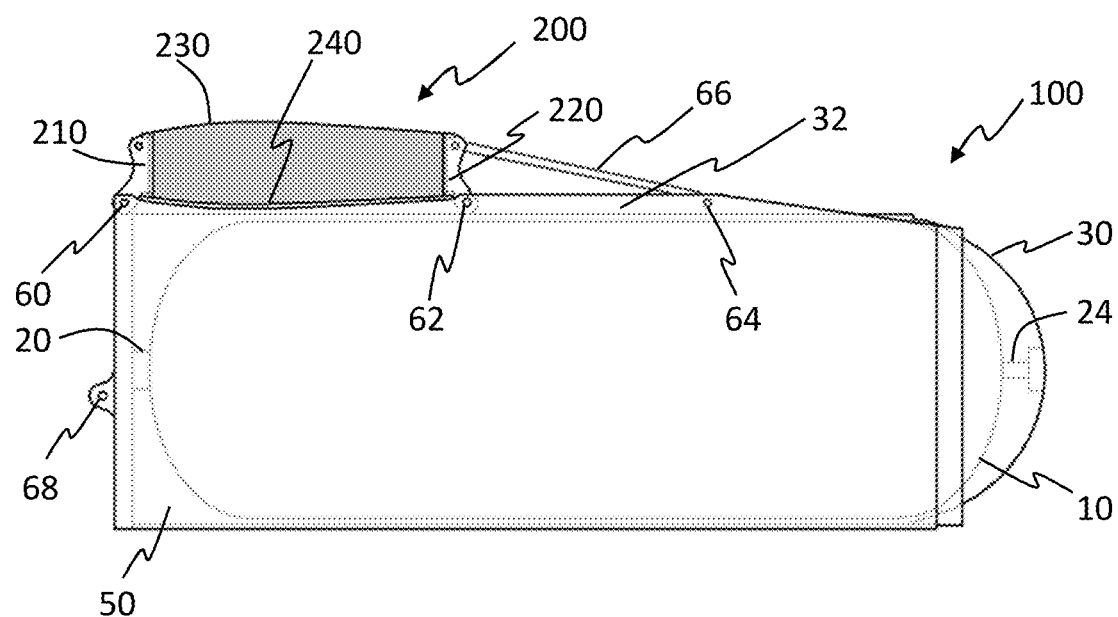
FIG. 3 illustrates a cryogenic tank secured to a wing box of an aircraft.

In FIG. 3 the tank 100 is mounted underneath a wing box 200 of a wing. As is typical of known wings, the wing box 200 includes a front spar 210, rear spar 220, upper cover 230 and lower cover 240. The wing box may be stiffened by ribs (not shown). The outer vessel 30 of the tank 100 comprises three pairs of mounting locations at which the tank 100 is mounted to the wing box 200: a pair of front spar mounting locations 60 provide a connection to a lower region of the front spar 210; a pair of rear spar mounting locations 62 provide a connection to a lower region of the rear spar 230; and a pair of aft mounting locations 64 provide a connection to an upper region of the rear spar 230 via a rear support truss 66. The aft mounting locations 64 and rear support truss 66 are included to avoid anticipated excitation-vibration issues, particularly in large tanks with a long longitudinal length, but it should be understood that they may be omitted in some embodiments. Of course, yet further mounting locations may be provided in yet further embodiments The forward face of the outer vessel 30 carries a pair of propulsion system mounts 68 to which the propulsion system (not shown) of the aircraft is connected. These pinned fittings transfer a portion of the propulsion system loads through the outer vessel 30 and into the rear spar 220. The propulsion system mounts 68 may comprise a machined metallic (e.g. aluminium) fitting that is fastened to the front bulkhead 46 of the outer vessel 30. The fasteners do not penetrate the bulkhead 46 (i.e. do not extend into the insulating volume 50) in order to avoid creating a leak path should removal/replacement of the mounts 68 be required. Alternatively, the mounts 68 may be formed integrally with the bulkhead 46.

A fairing (not shown) may conceal forward and rear portions of the tank 100 to improve its aerodynamic performance. In some embodiments there may be fewer than, or more than, two propulsion system mounts 68. In particular, some embodiments may have no propulsion system mounts.

Figure 4:
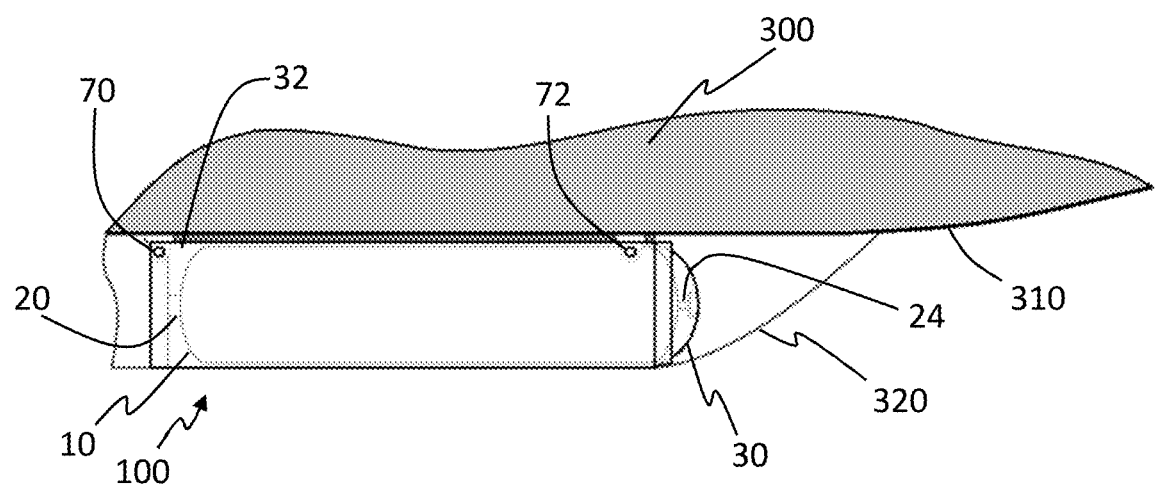
FIG. 4 illustrates a cryogenic tank secured to a fuselage of an aircraft.

In FIG. 4 the tank 100 is mounted beneath a fuselage section 300 of an aircraft. As is typical of known fuselages, the fuselage section 300 includes a series of circular frames (not shown) supporting an outer skin 310 that is stiffened by longitudinal stringers (not shown). The outer vessel 30 of the tank 100 comprises two pairs of mounting locations at which the tank 100 is mounted to two respective frames of the fuselage section: a pair of forward mounting locations 70; and a pair of rear mounting locations 72. A fairing 320 conceals forward and rear portions of the tank 100 to improve its aerodynamic performance.

Figure 5A:
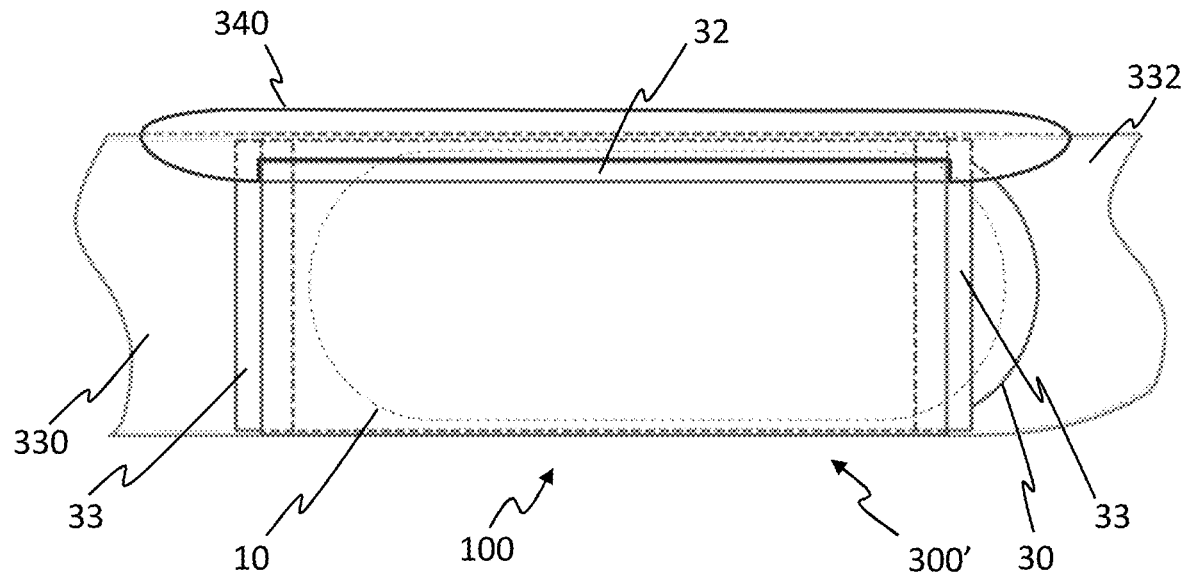
FIGS. 5A and 5B illustrate a cryogenic tank forming a fuselage section of an aircraft.
Figure 5B:
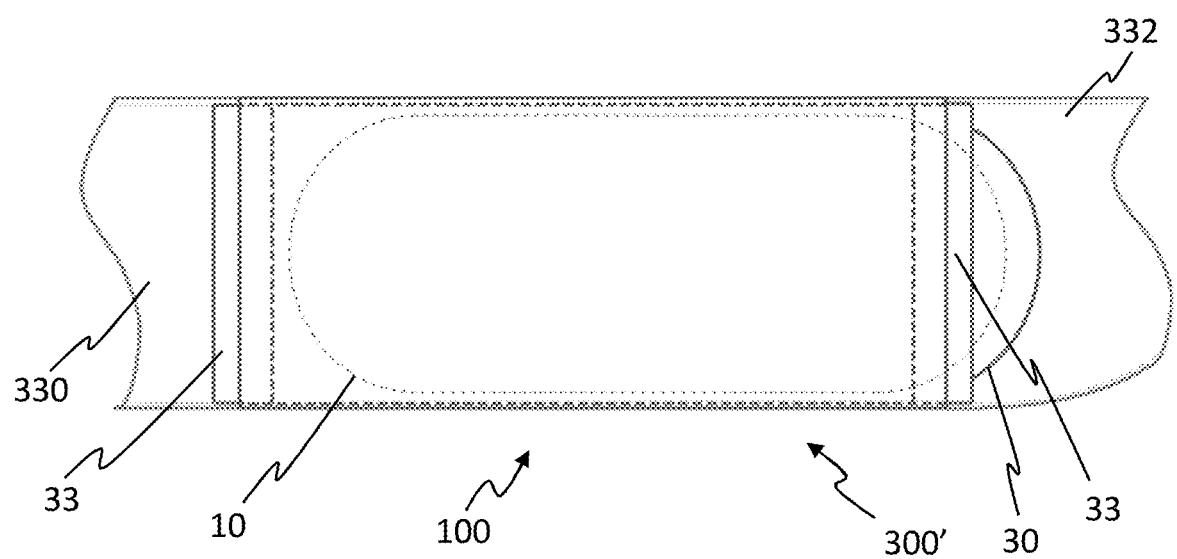

FIGS. 5A and 5B shows the tank 100 integrated into a fuselage of an aircraft so that the outer vessel 30 of the tank forms a fuselage section 300' of the aircraft connected between a first mating fuselage section 330 and a second mating fuselage section 332. In these embodiments annular flanges 33 provide forward and aft mounting locations. In these embodiments the annular flanges 33 extend outwardly at the forward and aft ends of the outer vessel 30 to form a mating joint with the first 330 and second 332 fuselage sections, respectively. Thus, the annular flanges provide an integral butt-strap or lap joint. The joints may be fastened with fasteners, or by any other appropriate fastening means.

In the embodiment illustrated in FIG. 5A a longitudinal flange 32 extending outwardly from an upper region of the outer vessel 30 may provide a mounting location for systems and/or control components (e.g. cabling or ducting) passing through the fuselage. A fairing 340 encloses the upper region of the tank 100 to conceal the flange 32 and the systems and/or control components to improve aerodynamic performance. In other embodiments the longitudinal flange 32 and the fairing 340 may be omitted, as shown in FIG. 5B.

In preferred embodiments the outer vessel 30 will be formed from a material with similar thermal properties to that of the airframe components to which it is connected, in order to avoid thermal loading effects. For example, the outer vessel 30 and airframe components may be formed from a reinforced fibre composite material, such as a carbon fibre reinforced composite material.

The outer vessel 30 is distinguished by its integral flanges, including longitudinal flanges 32 and annular flanges 33. The mounting locations may be provided on the integral flanges, and/or the integral flanges may provide mounting sites for structural, systems or other components. In particular, the integral flanges may be joined to structural airframe components to enable load transfer between the outer vessel 30 and the airframe.

The longitudinal flanges 32 extend longitudinally along the outer vessel, and upon which the mounting locations are provided. That is, the outer vessel 30 comprises a pair of outwardly extending longitudinal flanges 32, each flange providing one of each of the pairs of mounting locations described above. In the FIG. 3 embodiment each flange carries one of: the pair of front spar mounting locations 60; the pair of rear spar mounting locations 62; and the (optional) pair of aft mounting locations 64. In the FIG. 4 embodiment each flange carries one of: the pair of forward mounting locations 70; and the pair of rear mounting locations 72. Thus, the flanges 32 each provide a mounting member for mounting the tank 100 to an airframe of an aircraft. The flanges 32 may also provide mounting locations for other structural components, or for systems components.

The two annular flanges 33 (seen most readily in FIGS. 5A to 5C, but present in all illustrated embodiments) extend around an outer periphery of the outer vessel 30. As described below, the annular flanges 33 are formed at a join between the upper 38 and lower 34 panels and the end cap 44, and at a corresponding join between the upper 38 and lower 34 panels and the bulkhead 46.

The integral flanges 32, 33 may be shaped such that they have a greater height, thickness, volume and/or surface area in the region of a mounting location. In this way, secondary joining parts such as butt-straps can be eliminated, thus saving weight and design complexity. The flanges 32, 33 are also typically shaped to enable sealing at the joint between the flange and airframe structure. For example, where the flange provides a lap joint the flange may be shaped to provide a sufficient lapped area to enable adequate sealing. Similarly, the flange may be shaped to provide a close fit with adjoining structural components, as shown in FIG. 3. Thus, additional aerodynamic panels for sealing can also be eliminated.

Figure 6:
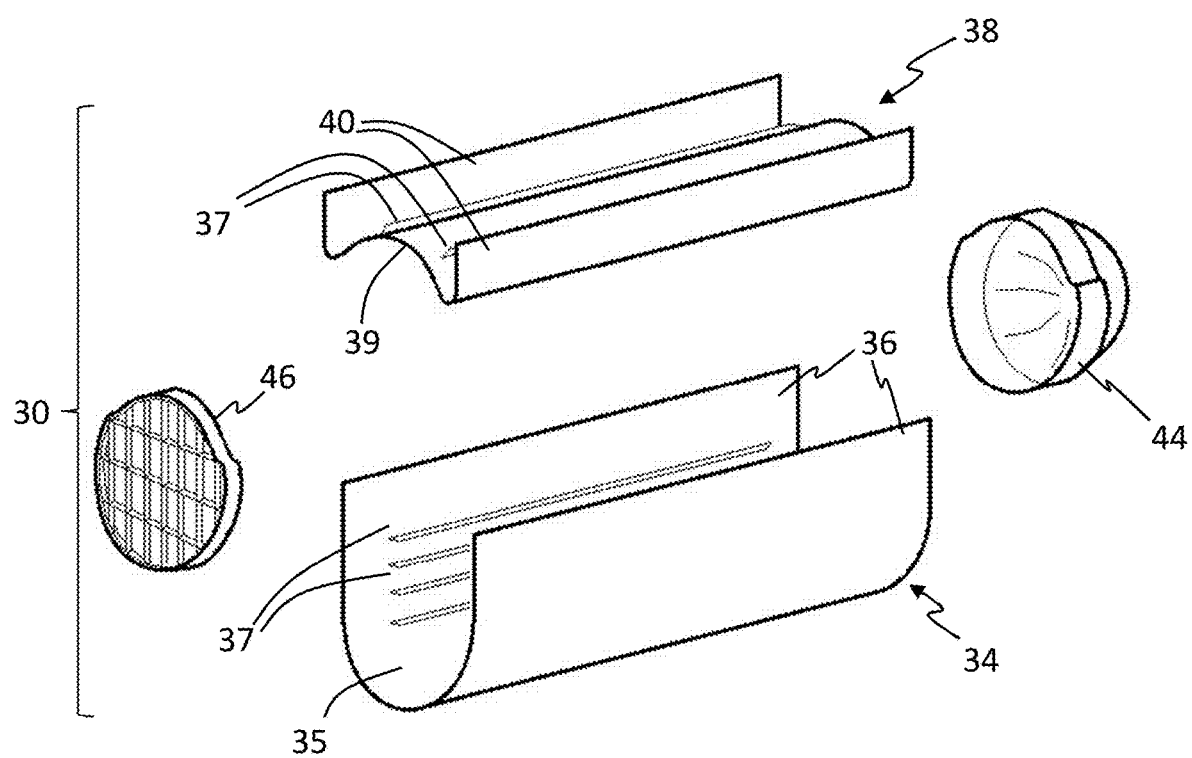
FIG. 6 provides an exploded view of the main components of the outer vessel of a cryogenic tank.

In some embodiments the mounting locations are provided in the form of fasteners, e.g. pins or bolts, that pass through fastener holes in the flanges 32. One example is illustrated in FIG. 6, which shows fasteners in the form of pins 42 that connect the flanges 32 to a structural member of the airframe 400. In the illustrated arrangement the heads of the pins 42 are countersunk to avoid unwanted steps in the aerodynamic surface that could reduce aerodynamic performance. The pins 42 are located within tapered bushes 43 inserted into fastener holes in the flanges 32, to create a locating and locking feature for the pins 42. This design solution is considered particularly advantageous because it will not be subject to fatigue failure.

A key advantage of providing the mounting locations on the flanges 32 in this way is that the fasteners do not penetrate the insulating volume 50. This both avoids the creation of a potential leakage route for vacuum or cryogenic fluids and the possibility of outgassing at a fastener site causing an electro-magnetic hazard, or lightning strike risk.

In preferred embodiments the outer vessel 30 is assembled from four main structural components, as illustrated in FIG. 5: lower panel 34, upper panel 38, end cap 44 and bulkhead 46.

In the illustrated embodiment the lower panel 34 comprises a generally U-shaped member with a curved base 35 and a pair of upstanding opposing walls 36. The lower panel 34 is formed from a thin sheet, or panel, which in this embodiment is reinforced by longitudinal stringers 37. The upper panel 38 is generally W-shaped in cross-section, such that it has a curved top portion 39 sandwiched between two upstanding flange portions 40. Like the lower panel, the upper panel 38 is formed from a thin sheet or panel, which in this embodiment is reinforced by longitudinal stringers 37. In related embodiments the flange portions 40 (and their cooperating opposing walls 36) may be provided so that they are not parallel to one another as shown, but are instead formed at an angle to one another, for example at an acute angle so that they diverge in the manner of the arms of a V-shape. When assembled, the upper panel 38 is slotted into the lower panel 34 such that the flange portions 40 overlap with the upper portions of the upstanding walls 36 to form the longitudinal flanges 32 of the outer vessel 30. This is best understood by review of FIG. 6.

In some embodiments a series of fasteners (not shown) connect the flange portions 40 with the upstanding walls 36, with the benefit that this both avoids the creation of a potential leakage route for vacuum or cryogenic fluids and the possibility of outgassing at a fastener site causing an electro-magnetic hazard, or lightning strike risk. In other embodiments this connection may be provided by co-curing or co-bonding during manufacture of the outer vessel 30. In mechanically fastened embodiments the joint between the flange portions 40 and upstanding walls 36 is sealed by providing a layer of interfay sealant 48 between the mating faces. An aerodynamic seal 49 (which can be attached to the flange) fills a gap between each flange 32 and the aircraft aerodynamic surface.

An end cap 44 encloses one end of the tube-like volume formed by the assembled upper 38 and lower 34 panels, and a reinforced bulkhead 46 encloses the other end. Either or both of these parts may comprise outwardly-extending annular flanges 33 to permit mounting of structural or systems components of the tank 100 or the airframe 400. These outwardly-extending annular flanges 33 comprise an overlap (or lap joint) between upper 38 and lower 34 panels and the end cap 44 and a corresponding overlap (or lap joint) between upper 38 and lower 34 panels and the bulkhead 46. These joints can be fastened via mechanical fasteners, bonding or co-bonding. Where mechanical fasteners are used as the joining means, the fasteners do not protrude into the insulating volume 50 of the tank avoiding the creation of a potential leakage route for vacuum or cryogenic fluids and the possibility of outgassing at a fastener site causing an electro-magnetic hazard, or lightning strike risk.

The bulkhead 46 is typically the final component to be assembled to enclose the outer vessel 30 around the inner vessel 10 and any systems components to be provided within the insulating volume 50.

FIGS. 9A-C illustrate possible configurations for this joint to provide adequate sealing of the insulating volume 50. The annular flange 33 is formed as a joint between mating annular flanges of the bulkhead 46 and the assembled upper 38 and lower 34 panels. A layer of interfay sealant 84 is provided between the mating surfaces.

In the arrangement shown in FIG. 9A an annular sealing channel 80 extends around the mating face of the annular flange of the bulkhead 46, an O-ring type seal 82 and/or bead of sealant material being provided within the sealing channel 80 during assembly to provide a fluid-tight seal between the bulkhead 46 and the assembled upper 38 and lower 34 panels.

In the arrangement shown in FIGS. 9B and 9C a bead of sealant material 86 is injected into the annular sealing channel 80 by a sealant gun 87 via one of a plurality of sealant ports 88. The sealant ports 88 comprise channels extending through the full thickness of the assembled upper 38 and lower 34 panels, with an opening configured to enable insertion of the nozzle of a sealant gun 87. When sealant material exits from another of the sealant ports 88 this indicates that the sealant channel 80 is adequately filled with sealant material.

This design in which the outer vessel 30 is assembled from a number of structural components simplifies the tooling required for its manufacture, while simultaneously providing a mounting member in the form of the longitudinal flanges 32 and annular flanges for mounting the tank 100 to the airframe and carrying flight loads, thermal loads and/or propulsion loads.

The inner vessel 10 is mounted within the outer vessel 30 by vessel mounting means located on the longitudinal axis 16, the vessel mounting means including a fixed mount 20 and a floating mount 24.

The fixed mount 20 is located at one axial end of the inner vessel 10 and provides a rigid connection between the two vessels, through which conduits 22 of the fuel systems enter the inner vessel 10. The conduits 22 in this embodiment include a refuel line 22a, liquid fuel outlet line 22b, pressure line 22c, and vent line 22d. The floating mount 24 at the other axial end of the inner vessel 10 provides a floating (or flexible) connection between the inner 10 and outer 30 vessels, that allows relative movement therebetween. Thus, the inner vessel 10 is isolated (either fully or partially) from loads carried by the outer vessel 30. That is, the inner vessel 10 experiences no or minimal distortion as a result of movement or deformation of the outer vessel 30 caused by flight loads, thermal loads, propulsion loads, or a combination of all three.

Figure 7:
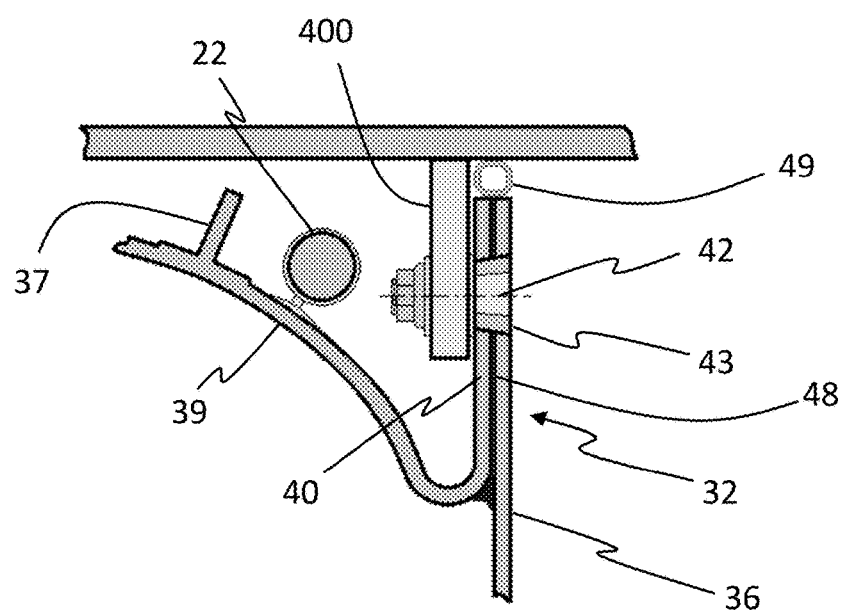
FIG. 7 provides a sectional view illustrating the attachment of the longitudinal flange of a cryogenic tank to an airframe of an aircraft.
Figure 8:
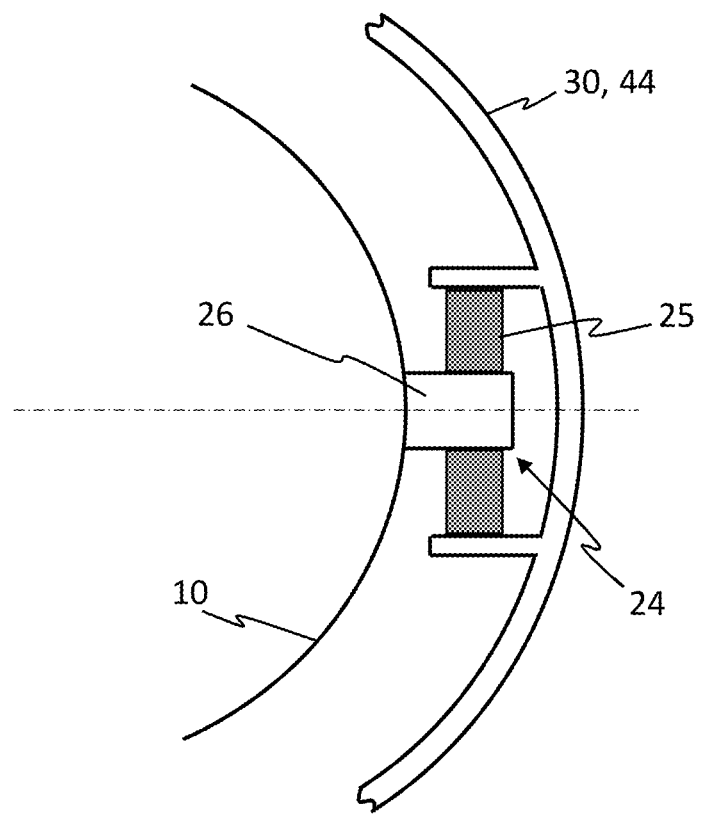
FIG. 8 schematically illustrates a vessel mounting means of a cryogenic tank.

The floating mount 24 is illustrated in FIG. 7. A generally horizontally-orientated shaft 25 with an outer bearing surface is rigidly mounted to the domed end cap of the outer vessel 30 so that it projects inwardly into the insulating volume 50. A cooperating sleeve 26 with a cooperating inner bearing surface is able to slide along the bearing surface of the shaft 25 and rotate relative to it about the shaft's longitudinal axis. The sleeve 26 is rigidly mounted to the domed end cap of the inner vessel 30. The shaft 25 is formed either partially or fully from a thermally-insulating material such as a glass-fibre reinforced composite material (GFRP) in order to isolate the outer vessel 30 from the low temperatures of the cryogenic fluid contained by the inner vessel 10. In alternative embodiments, the shaft 25 may have an alternative orientation; for example, it may be generally vertically-orientated.

In preferred embodiments the outer vessel 30 is formed from a composite material. For example, the lower panel 34, upper panel 38 and end cap 44 may be moulded from a fibre reinforced composite material such as a carbon fibre reinforced material. The bulkhead 46 may be machine formed from a metal such as aluminium, or alternatively may be moulded from a fibre reinforced composite material. In some embodiments the lower panel 34, upper panel 38 and end cap 44 may be integrally formed. The inner vessel 10 is preferably formed from a metal such as aluminium, but in some embodiments may also be fibre reinforced material.

What is claimed is:

1. An aircraft, comprising:
an airframe configured to transmit aircraft flight loads,
a propulsion system, and
a cryogenic tank supplying cryogenic fuel to the propulsion system, the cryogenic tank comprising
an inner vessel defining a closed volume configured to carry the cryogenic fuel;
an outer vessel enclosing the inner vessel to define an insulating volume therebetween, the insulating volume comprising a vacuum, and the outer vessel comprising
a mounting member for structurally connecting the outer vessel of the cryogenic tank to the airframe, the mounting member permitting transfer of static and/or dynamic loads between the airframe and the outer vessel; and
a vessel mount structurally connecting the inner vessel to the outer vessel and configured to isolate the inner vessel from said static and/or dynamic loads carried by the outer vessel,
wherein the mounting member includes a flange extending outwardly from and longitudinally along the outer vessel,
wherein the outer vessel comprises a first panel and a second panel, the first panel comprising an outwardly-extending flange portion that overlaps with a corresponding region of the second panel to thereby join the first panel and the second panel and provide the flange extending outwardly from the outer vessel,
wherein the first panel and the second panel define a tube-shaped volume, and
wherein the outer vessel further comprises a first end cap and a second end cap to seal the tube-shaped volume.

2. The aircraft according to claim 1,
wherein the mounting member comprises two or more longitudinally-spaced mounting locations for connecting the outer vessel to the airframe and
wherein the mounting member is configured to transfer the static and/or dynamic loads between the two or more longitudinally-spaced mounting locations.

3. The aircraft according to claim 1,
wherein the flange extending outwardly from the outer vessel includes a fastener hole at a mounting location, the fastener hole being configured to accommodate a fastener to connect the cryogenic tank to the airframe and
wherein the fastener hole extends through the flange extending outwardly from the outer vessel and does not penetrate the insulating volume.

4. The aircraft according to claim 1, wherein the flange extending outwardly from the outer vessel is formed integrally with the first panel and the second panel of the outer vessel.

5. The aircraft according to claim 1, wherein the outer vessel has an outer surface that forms an outer surface of the airframe.

6. The aircraft according to claim 1,
wherein the outer vessel comprises a reinforcing member mounted on the first panel, and
wherein the reinforcing member projects inwardly from the first panel of the outer vessel into the insulating volume.

7. The aircraft according to claim 1, wherein the vessel mount comprises a floating mount which permits relative movement between the inner vessel and the outer vessel.

8. The aircraft according to claim 7, wherein the floating mount comprises
a first mounting member connected to the inner vessel and
a second mounting member connected to the outer vessel,
the first mounting member and the second mounting member being interconnected to permit relative linear and/or rotational movement therebetween; and optionally
a bushing comprising a thermal insulating material for limiting heat transfer between the first mounting member and the second mounting member.

9. A cryogenic tank for supplying cryogenic fuel to a propulsion system of a vehicle, the cryogenic tank comprising:
an inner vessel defining a closed volume configured to carry a cryogenic fuel;
an outer vessel enclosing the inner vessel to define an insulating volume therebetween, the insulating volume comprising a vacuum, and the outer vessel comprising:
a first panel comprising an outwardly-extending flange portion;
a second panel with a corresponding region which overlaps with the outwardly extending flange portion to thereby join the first panel and the second panel and provide a flange extending outwardly from the outer vessel; wherein
the flange extending outwardly from the outer vessel extends longitudinally along the outer vessel and permits transfer of static and/or dynamic loads between the vehicle and the outer vessel; and
the cryogenic tank further comprising a vessel mounting structure connecting the inner vessel to the outer vessel, and configured to avoid transfer of said static and/or dynamic loads from the outer vessel to the inner vessel, wherein the outwardly extending flange portion of the first panel comprises a pair of flange portions and the corresponding region of the second panel comprises a pair of opposing walls, and wherein the second panel is nested within the first panel such that the pair of flange portions overlap with the pair of opposing walls to define the flange extending outwardly from the outer vessel.

10. The cryogenic tank of claim 9, wherein the first panel comprises a U-shaped member having a pair of upstanding opposing walls, an upper portion of each wall defining the outwardly-extending flange portion; and the second panel is W-shaped in cross-section, having a curved top portion sandwiched between two upstanding flange portions which define the corresponding region which overlaps with the outwardly extending flange portion of the first panel.

11. The cryogenic tank of claim 9, wherein the first panel and the second panel define a tube-shaped volume, and the outer vessel further comprises a first end cap and a second end cap to seal the tube-shaped volume.

12. The cryogenic tank of claim 11, wherein the first end cap comprises a dome-shaped member and wherein the second end cap comprises a bulkhead.

13. The cryogenic tank of claim 9, wherein a reinforcing member projects inwardly from at least one of the first panel and the second panel of the outer vessel into the insulating volume.

14. The cryogenic tank of claim 9, wherein the flange extending outwardly from the outer vessel includes a fastener hole at a mounting location, the fastener hole being configured to accommodate a fastener to connect the cryogenic tank to the vehicle and wherein the fastener hole extends through the flange extending outwardly from the outer vessel and does not penetrate the insulating volume.

15. An aircraft comprising an airframe configured to transmit aircraft flight loads, a propulsion system, and the cryogenic tank of claim 9 for supplying the cryogenic fuel to the propulsion system.

16. An aircraft, comprising:

an airframe configured to transmit aircraft flight loads, a propulsion system, and a cryogenic tank supplying cryogenic fuel to the propulsion system, the cryogenic tank comprising an inner vessel defining a closed volume configured to carry the cryogenic fuel;

an outer vessel enclosing the inner vessel to define an insulating volume therebetween, the insulating volume comprising a vacuum, wherein the outer vessel comprises:

a first panel comprising a pair of spaced apart flange portions and a second panel comprising a pair of opposing walls;

the first panel and the second panel being nested such that the pair of spaced apart flange portions overlap with the pair of opposing walls to define outwardly-extending flanges which extend longitudinally along the outer vessel and are integral to the outer vessel; and wherein each outwardly extending flange comprises at least two longitudinally-spaced mounting locations which connect the outer vessel to the airframe, without penetrating into the insulating volume, so that static and/or dynamic loads can be transferred between the at least two longitudinally-spaced mounting locations; and the cryogenic tank further comprising a vessel mount structurally connecting the inner vessel to the outer vessel and comprising:

a floating mount having a first mounting member connected to the inner vessel and a second mounting member connected to the outer vessel, the first mounting member and the second mounting member being interconnected to allow relative movement therebetween to enable relative movement between the inner vessel and the outer vessel to at least partially isolate the inner vessel from said static and/or dynamic loads carried by the outer vessel.

* * * * *